US006288912B1

(12) United States Patent
Bedouet

(10) Patent No.: US 6,288,912 B1
(45) Date of Patent: Sep. 11, 2001

(54) POWER SUPPLY DEVICE FOR A LIGHT BOX INCLUDING FIRST AND SECOND DC TO DC CONVERTORS AND ENERGY RESERVE

(75) Inventor: Bernard Bedouet, Bourg-les-Valence (FR)

(73) Assignee: Thomson-CSF Sextant, Velizy Villacoublay (FR)

( * ) Notice: Subject to any disclaimer, the term of this patent is extended or adjusted under 35 U.S.C. 154(b) by 0 days.

(21) Appl. No.: 09/581,501

(22) PCT Filed: Dec. 15, 1998

(86) PCT No.: PCT/FR98/02739

§ 371 Date: Jun. 16, 2000

§ 102(e) Date: Jun. 16, 2000

(87) PCT Pub. No.: WO99/31940

PCT Pub. Date: Jun. 24, 1999

(30) Foreign Application Priority Data

Dec. 16, 1997 (FR) ..................... 97 15949

(51) Int. Cl.[7] ..................... H02M 3/22
(52) U.S. Cl. ..................... 363/15
(58) Field of Search ..................... 363/15, 65, 123; 323/273, 282; 307/64, 80, 82, 83

(56) References Cited

U.S. PATENT DOCUMENTS 3,573,598 * 4/1971 Clarke et al. ..................... 363/27
4,450,384 * 5/1984 Krokaugger ..................... 315/127
4,797,803 * 1/1989 Carroll ..................... 363/95
4,975,819 * 12/1990 Lannuzel ..................... 363/16

* cited by examiner

*Primary Examiner*—Adolf Deneke Berhane
(74) *Attorney, Agent, or Firm*—Oblon, Spivak, McClelland, Maier & Neustadt, P.C.

(57) ABSTRACT

A power supply device (201) for a light box (102) is provided for the backlighting of liquid crystal display screens. The device (201) includes a regulating DC/DC converter (204) of the booster type, powered directly by a 28-volt power supply so as to deliver directly a 50-volt stabilized DC voltage for powering the light box (102). The converter (204) includes an output diode (208) which protects the device. An energy reserve is obtained via a capacitor (209) supplied directly with the 50-volt voltage. A second converter (111) with galvanic isolation provides a set of supply voltages to electronic control cards (103) of display screens illuminated by the light box (102). A link between the light box (102) and the control cards (103) is effected by a galvanic isolation device (210). The device (201) makes it possible to increase the efficiency of the power supply so as to decrease weight, volume and cost thereof.

3 Claims, 1 Drawing Sheet

POWER SUPPLY DEVICE FOR A LIGHT BOX INCLUDING FIRST AND SECOND DC TO DC CONVERTORS AND ENERGY RESERVE

BACKGROUND OF THE INVENTION

1. Field of the Invention

The present invention relates to devices intended for supplying electrical power to a light box, that is to say a fluorescent lighting system making it possible for example to illuminate a liquid crystal display screen by transmission.

2. Discussion of the Background

Light boxes are known devices which make it possible to obtain over a relatively extended plane surface, generally of rectangular shape, very uniformly distributed light energy making it possible to examine transparent objects.

A light box can serve for various uses, for example for examining photographic negatives. It is also much used to illuminate, by transparency, the liquid crystal display screens which are increasingly being used instead of cathode-ray tubes.

These liquid crystal screens serve in particular as on-board aircraft displays for providing the pilot with the information he needs, in particular the indications which were previously displayed with the aid of electromechanical indicators.

In a known manner, a light box used to illuminate a liquid crystal display screen in an aircraft consists, for the sake of uniformity of illumination and for luminous intensity, of a battery of fluorescent tubes aligned one against the other and supplied with a large voltage, of the order of 1000 volts, delivered by a high voltage converter.

For simplicity, in the subsequent text the term light box will designate the assembly composed of the battery of fluorescent tubes and of its high voltage supply converter.

To obtain suitably stable lighting, exhibiting no fluctuations irritating the operator, it is necessary to supply the light box with a DC voltage, whose value may lie between 25 and 50 volts but must be suitably stable.

Patent Application GB 2 229 873 discloses a supply circuit for powering a discharge lamp of a car, which operates on the basis of a battery with stable voltage and which comprises protection and warning circuits intended for protecting the assembly, in particular against the consequences of poor operation of the device for igniting the lamp.

It is known that in aeroplanes the DC voltage available for powering the ancillaries is provided by a so-called "28-volt" network. This title is entirely appropriate since, given the various constraints, the actual voltage of this network may vary within considerable limits, lying for example between 12 and 50 volts. It is not therefore possible to power the light box directly from this network.

Furthermore, in order to avoid being confronted with problems of earth loops between primary and secondary of the equipment, there is reason to produce galvanic isolation between the 28-volt network and the light box.

In order simultaneously to obtain appropriate regulation of the supply voltage of the light box and isolation of the latter with respect to the network, it is known practice to use a power supply device comprising a galvanically isolated regulating converter. Such a device is produced for example according to the diagram represented in the appended FIG. 1.

In this figure, a power supply 101 supplies on the one hand a light box 102 and on the other hand an assembly of electronic cards 103 intended for processing the information to be addressed to the LCD display screen (not represented in this figure) which is fixed to the surface of the light box 102. This light box 102 itself comprises in a known manner an assembly of fluorescent tubes 104 powered via a high voltage converter comprising a chopper 105 and a booster transformer 106.

The supply device 101 operates from an input voltage of +28 volts, and which, as has been seen, fluctuates widely. This voltage charges, by way of an isolating diode 108, an assembly of capacitors 109. This diode makes it possible both to protect the equipment against reversals of polarity and to avoid reverse discharging of the capacitors into the supply network during outages of the latter. These capacitors themselves make it possible to guarantee the power supply to the downstream circuits during these possible outages.

The capacitors 109 furthermore make it possible to supply two regulated voltage converters 110 and 111 intended for supplying the light box 102 and the electronic cards 103 respectively. These capacitors are for example of the "fly-back" or "forward" known type, whose efficiency is known to lie between 80 and 85%. This efficiency, which might appear to be appropriate in other circumstances, nevertheless exhibits drawbacks with regard to an aircraft where the power available is metered and where the heat originating from the corresponding losses must be dispersed. Furthermore, the converters of this type are relatively expensive and voluminous.

The converter 110 is of the DC/DC regulating and booster type with galvanic isolation. It makes it possible to provide the supply voltage for the light box 102. This supply voltage is for example 50 volts so as to be at the top limit of the variations in the supply voltage originating from the +28-volt DC network.

The converter 111 is of the DC/DC regulating type with galvanic isolation and makes it possible to deliver all the voltages required by the electronic cards 103, for example +5 volts +15 volts and −15 volts.

SUMMARY OF THE INVENTION

To alleviate the drawbacks of such a structure, the invention proposes a supply device for powering a light box from an unstable power supply network, of the type comprising means of protection against reversals of polarity and outages of this network, a capacitor forming an energy reserve and a regulating DC/DC converter for obtaining the stabilized supply voltage for the light box from the network, chiefly characterized in that this converter is powered directly by the network, that it is of the booster type comprising an output diode which furthermore plays the role of the said means of protection, and that the said capacitor is connected directly at the output of the converter so as to be charged by the supply voltage of the light box.

According to another characteristic, the device furthermore comprises a second regulating DC/DC converter of the step-down type with galvanic isolation so as to obtain, from the output voltage of the first converter, a set of stabilized supply voltages required by the electronic control cards of a display device illuminated by the light box and the link between these cards and this display device is effected with a galvanic isolation device.

According to another characteristic, the unstable supply network is of the 28 volts DC type and the supply voltage of the light box is substantially-50 volts.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 2:
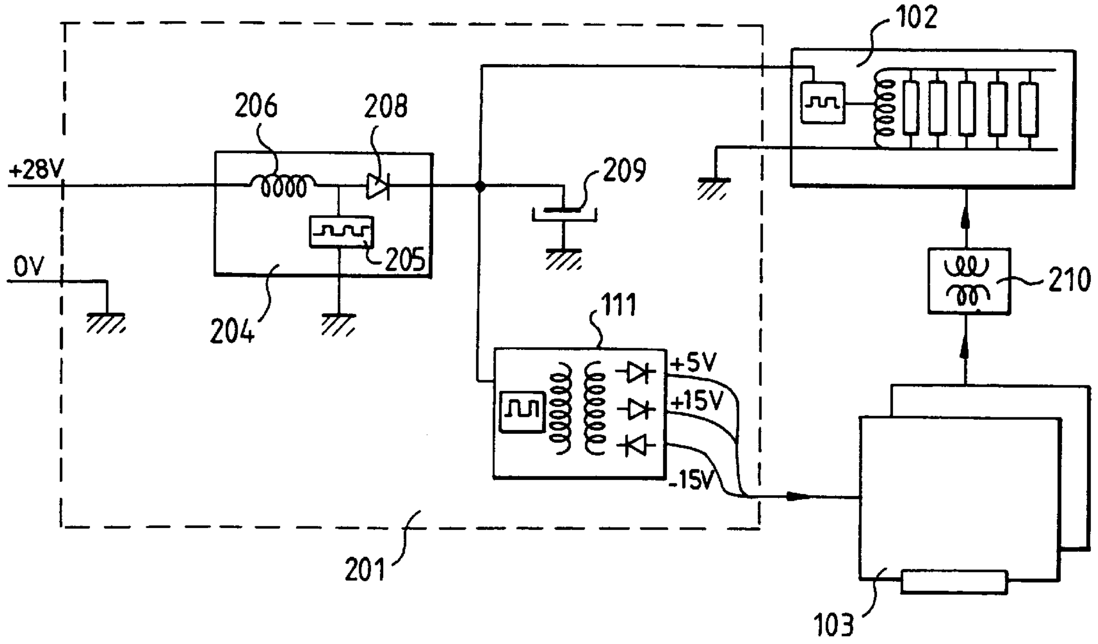
FIG. 2 is a schematic diagram of a light box device, according to the present invention.

Referring now to the drawings, wherein like reference numerals designate identical or corresponding parts throughout the several views, and more particularly to FIG. 2 thereof, there is illustrated an exemplary light box device of the present invention.

Figure 1:
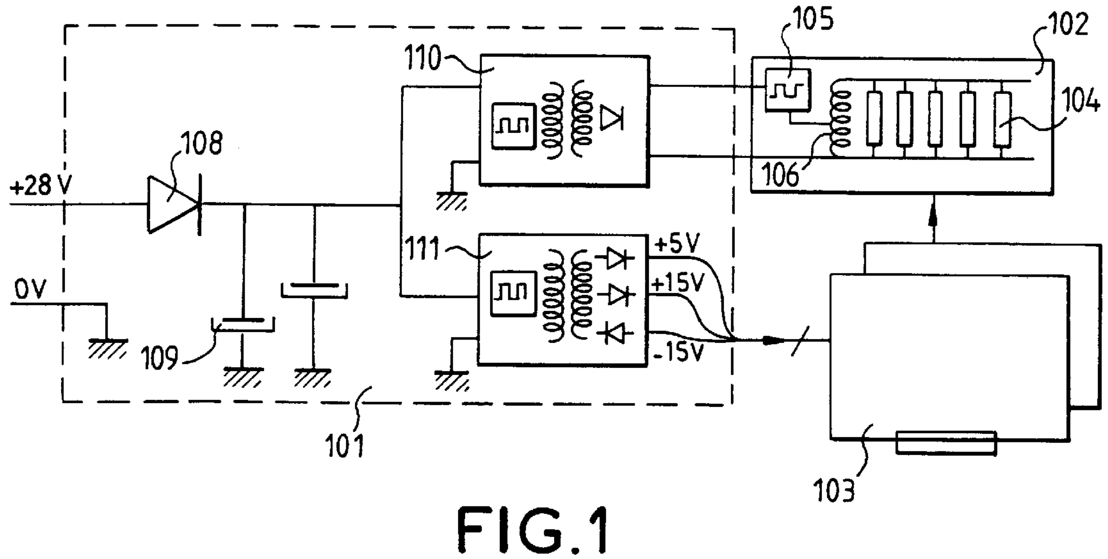
FIG. 1 is a schematic diagram of a known light box device.

The device according to the invention, represented diagrammatically in FIG. 2, comprises power supply means 201 making it possible to deliver the supply voltages required by a light box 102 and by electronic control cards 103 which are identical to those of FIG. 1.

According to the invention however, in the device 201 the input voltage of the network, +28 volts, is applied directly to a regulating DC/DC converter 204 which is of the "boost" type without galvanic isolation.

In a known manner, this converter comprises very diagrammatically a series inductor 206 whose output is linked on the one hand to earth via a chopper 205 and on the other hand to a series diode 208 which directly delivers the 50-volt output voltage required for powering the light box 102.

This converter 204 makes it possible to compensate for the variations in the 28-volt network with very good efficiency, which as is known, for a converter of this type, may reach a value of the order of 95%.

Furthermore, the output diode 208 of the converter, which participates in the voltage boosting function, makes it possible also to carry out the function of protection against reversals of polarity of the network and of blocking of the reverse discharging of the energy reserve described later.

The output of the converter 204 is in fact applied to a capacitor 209, linked moreover to earth, which makes it possible to store the energy required by the device powered by the block 201 during the instants or the +28 mains is down, or else drops to a value below that which allows the converter 204 to make up the voltage difference.

By virtue of the greater voltage at the output of this converter 204 than at the output of the diode 108 of FIG. 1, this capacitor 209, which serves as energy reserve, can be considerably smaller in size than the capacitors 109, whilst yet making it possible to obtain the same duration of protection with regard to outages.

The output voltage of the converter 204 furthermore makes it possible to power a converter 111 of the DC/DC regulating type with galvanic isolation which serves to deliver the output voltages required by the cards 103, for example +5 volts, +15 volts and −15 volts.

This converter may be identical to the converter 111 of FIG. 1.

It is then observed that in this solution there is no longer any galvanic isolation between the light box 102 and the +28-volt DC mains.

This does not present any drawbacks since the light box proper does not comprise any logic circuits liable to be affected by such a lack of galvanic isolation.

The electronic cards 103 are on the other hand powered via the converter 111, which does exhibit galvanic isolation. Hence, to ensure complete protection of these cards it is then appropriate to ensure galvanic protection in the link between them and the display screen situated on the light box. The invention therefore proposes that this link be made with the aid of interface means 210 which will make it possible to provide such galvanic isolation, for example by using transformers or optical-coupling systems which are known.

In conclusion, the device according to the invention makes it possible to obtain the same results from the point of view of stability, defence against outages and galvanic isolation as in the known art, whilst exhibiting noteworthy simplicity of realization, affording far better efficiency and exhibiting particularly low bulk and weight.

Numerous modifications and variations of the present invention are possible in light of the above teachings. It is therefore to be understood that within the scope of the appended claims, the invention may be practiced otherwise than as specifically described herein.

What is claimed is:

1. A supply device for powering a light box from an unstable power supply, comprising:

a first regulating DC to DC convertor of the booster type configured to provide stable power to the light box and coupled between the power supply and the light box and including a diode on an output thereof configured to protect against reversals of polarity and outages of the power supply;

a capacitor coupled to the output of the first DC to DC converter so as to be charged thereby and so as to form an energy reserve for the light box;

a second regulating DC/DC converter of the step-down type coupled to the output of the first DC to DC convertor and including galvanic isolation and configured to generate from an output voltage of the first DC to DC converter a plurality of stabilized supply voltages provided to an electronic control card of a display device illuminated by the light box, wherein the first DC to DC converter is powered directly and permanently by the power supply, and a link between the control card and the display device is effected with a galvanic isolation device.

2. The device according to claim 1, wherein the power supply comprises a 28 volt DC power supply, and the output voltage of the first DC to DC convertor provided to the light box is substantially 50 volts.

3. The device according to claim 1, wherein the plurality of stabilized supply voltages provided to the control card include +5 volts, +15 volts and −15 volts.

* * * * *